US011941165B2

(12) United States Patent
Niijima et al.

(10) Patent No.: US 11,941,165 B2
(45) Date of Patent: Mar. 26, 2024

(54) TEMPERATURE STIMULUS PRESENTATION APPARATUS AND METHOD

(71) Applicant: Nippon Telegraph and Telephone Corporation, Tokyo (JP)

(72) Inventors: Arinobu Niijima, Musashino (JP); Toki Takeda, Musashino (JP); Takafumi Mukouchi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 72 days.

(21) Appl. No.: 17/796,799

(22) PCT Filed: Feb. 10, 2020

(86) PCT No.: PCT/JP2020/005033
§ 371 (c)(1),
(2) Date: Aug. 1, 2022

(87) PCT Pub. No.: WO2021/161359
PCT Pub. Date: Aug. 19, 2021

(65) Prior Publication Data
US 2023/0053021 A1    Feb. 16, 2023

(51) Int. Cl.
*G06F 3/01* (2006.01)
*G06F 3/00* (2006.01)

(52) U.S. Cl.
CPC ............. *G06F 3/011* (2013.01); *G06F 3/002* (2013.01); *G06F 3/016* (2013.01)

(58) Field of Classification Search
CPC ............ G06F 3/011; G06F 3/016; G08B 6/00
See application file for complete search history.

(56) References Cited

U.S. PATENT DOCUMENTS

| | | | |
|---|---|---|---|
| 10,437,340 B1* | 10/2019 | Sullivan | G01K 13/20 |
| 2012/0133494 A1* | 5/2012 | Cruz-Hernandez | G06F 3/04886 340/407.1 |
| 2013/0120290 A1* | 5/2013 | Yumiki | G06F 3/0488 345/173 |
| 2017/0084137 A1* | 3/2017 | Coish | G08B 6/00 |
| 2019/0035234 A1* | 1/2019 | Howard | G08B 6/00 |
| 2019/0072438 A1* | 3/2019 | Yi | G06F 3/011 |
| 2019/0339783 A1* | 11/2019 | Sato | G06F 3/016 |
| 2020/0364994 A1* | 11/2020 | Birnbaum | G08B 21/18 |

OTHER PUBLICATIONS

Jones et al., "Warm or cool, large or small? The challenge of thermal displays," IEEE Transactions on Haptics, 2008, 1(1):53-70.

* cited by examiner

*Primary Examiner* — Andrew W Bee
(74) *Attorney, Agent, or Firm* — Fish & Richardson P.C.

(57) ABSTRACT

A temperature stimulus presentation device includes a presentation unit that generates heat at a predetermined temperature, and a control unit that changes an area of the presentation unit depending on whether or not a temperature stimulus is presented.

4 Claims, 6 Drawing Sheets

(a) ON  (b) OFF (a) ON (b) OFF

TEMPERATURE STIMULUS PRESENTATION APPARATUS AND METHOD

CROSS-REFERENCE TO RELATED APPLICATIONS

This application is a National Stage application under 35 U.S.C. § 371 of International Application No. PCT/JP2020/005033, having an International Filing Date of Feb. 10, 2020. The disclosure of the prior application is considered part of the disclosure of this application, and is incorporated by reference in its entirety into this application.

TECHNICAL FIELD

The present invention relates to a temperature stimulus presentation device and a temperature stimulus presentation method.

BACKGROUND ART

In the related art, a tactile display using a temperature stimulus has been developed as a means for feeding back a tactile stimulus (NPL 1). For example, a Peltier element (a thermoelectric element) has been developed as an actuator for presenting a temperature stimulus to a contact user, and a current is applied to the Peltier element so that a metal surface on one side is warmed up and a metal surface on the other side is cooled.

CITATION LIST

Non Patent Literature

[NPL 1] Lynette A. Jones, et al., "Warm or cool, large or small? The challenge of thermal displays", IEEE TRANSACTIONS ON HAPTICS, VOL. 1, NO. 1, January to June 2008, pp. 53-70

SUMMARY OF THE INVENTION

Technical Problem

However, since it takes time (several seconds) to change a temperature, there is a delay in presenting heat at a designated temperature. That is, there is a problem that a delay of several seconds occurs because ON and OFF of a current is switched and ON and OFF of a temperature stimulus is presented in a state in which a user touches the Peltier element.

The present invention has been made in view of the above circumstances, and an object of the present invention is to provide a technology capable of rapidly switching between ON and OFF of temperature stimulus.

Means for Solving the Problem

A temperature stimulus presentation device according to an aspect of the present invention includes a presentation unit configured to generate heat at a predetermined temperature; and a control unit configured to change an area of the presentation unit depending on whether or not a temperature stimulus is presented.

A temperature stimulus presentation device according to an aspect of the present invention includes a planar contact unit configured to come into contact with a human body; a presentation unit disposed separately on a side of the contact unit not in contact with the human body to generate heat at a predetermined temperature; and a control unit configured to change a distance of the presentation unit with respect to the contact unit depending on whether or not a temperature stimulus is presented.

A temperature stimulus presentation method according to an aspect of the present invention includes generating, by a presentation unit, heat at a predetermined temperature; and changing, by a control unit, an area of the presentation unit depending on whether or not a temperature stimulus is presented.

A temperature stimulus presentation method according to an aspect of the present invention includes generating, by a presentation unit, heat at a predetermined temperature; and changing, by a control unit, a distance of the presentation unit with respect to a planar contact unit depending on whether or not a temperature stimulus is presented, the contact unit coming into contact with a human body.

Effects of the Invention

According to the present invention, it is possible to provide a technology capable of rapidly switching between ON and OFF of temperature stimulus.

DESCRIPTION OF EMBODIMENTS

Hereinafter, embodiments of the present invention will be described with reference to the drawings. In the description of the drawings, the same parts are denoted by the same reference signs and description thereof will be omitted.

1. Overview of the Present Invention

In the present invention, a presentation area of a temperature stimulus is changed. By changing the presentation area of the temperature stimulus, it is possible to rapidly switch between ON and OFF of the temperature stimulus. As described in NPL 1, a threshold value of temperature stimulus perception is inversely proportional to a size of the presentation area of the temperature stimulus. In the case of warm sensation stimulation, a threshold value of temperature perception is halved when the presentation area is doubled. That is, when the presentation area is larger, the perception is easier. In the present invention, this perceptual characteristic is used to increase the presentation area of the temperature stimulus when the temperature stimulus is desired to be turned ON, and decrease the presentation area of the temperature stimulus when the temperature stimulus is desired to be turned OFF. The area of the temperature stimulus is mechanically controllable, which can reduce a delay time of the temperature stimulus.

2. First Embodiment

[2.1. Configuration of Temperature Stimulus Presentation Device]

Figure 1:
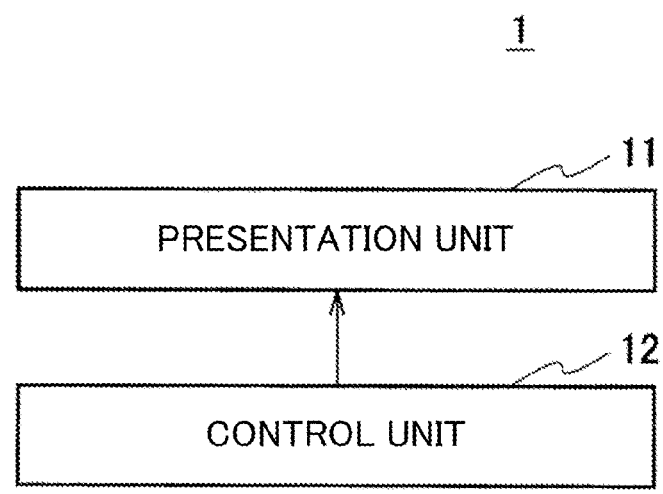
FIG. 1 is a diagram illustrating a configuration of a temperature stimulus presentation device according to a first embodiment.

FIG. 1 is a diagram illustrating a configuration of the temperature stimulus presentation device 1 according to a first embodiment. The temperature stimulus presentation device 1 includes a presentation unit 11 and a control unit 12.

The presentation unit 11 has a structure and a function of generating heat at a predetermined temperature. The presentation unit 11 includes, for example, a mesh structure in which heating wires are arranged in a mesh pattern. The presentation unit 11 generates heat at a predetermined temperature from the mesh-shaped heating wires in response to an application of a current from the outside, thereby causing a contact user of the presentation unit 11 to perceive a temperature stimulus.

The control unit 12 has a function and a mechanism for changing an area of the presentation unit 11 depending on whether or not the temperature stimulus is presented. The control unit 12 includes, for example, a computer installed in a housing of the temperature stimulus presentation device 1 and a control mechanism that mechanically controls the presentation unit 11. For example, when the computer receives a temperature stimulus ON instruction from the outside, the computer inputs a temperature stimulus ON command for giving a temperature stimulus to the control mechanism. The control mechanism changes a shape of the presentation unit 11 on the basis of the temperature stimulus ON command, and increases the number of heating wires per unit area (density of heating wires). On the other hand, when the computer receives a temperature stimulus OFF instruction from the outside, the computer inputs a temperature stimulus OFF command for not giving the temperature stimulus to the control mechanism. The control mechanism changes the shape of the presentation unit 11 to reduce the number of heating wires per unit area (the density of the heating wires) on the basis of the temperature stimulus OFF command.

[2.2. Operation of Temperature Stimulus Presentation Device]

Figure 2:
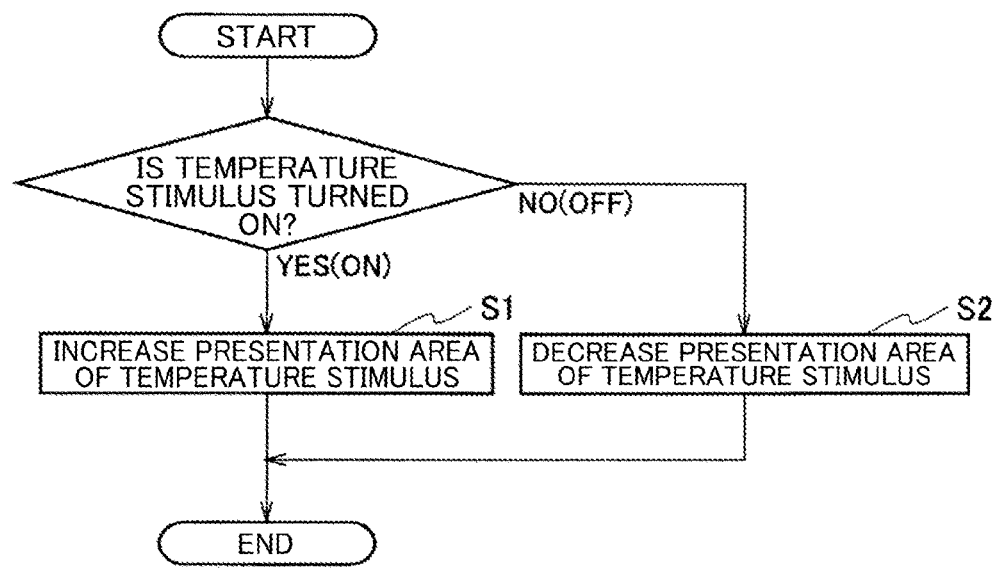
FIG. 2 is a diagram illustrating a processing flow of a temperature stimulus presentation method according to the first embodiment.

FIG. 2 is a diagram illustrating a processing flow of a temperature stimulus presentation method that is performed by the temperature stimulus presentation device 1. The temperature stimulus presentation device 1 switches between ON and OFF of the temperature stimulus presentation by changing a presentation area (=presentation unit 11) of the temperature stimulus.

Step S1

Figure 3:
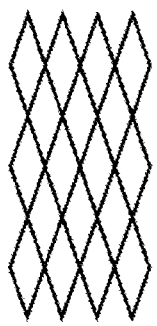
FIG. 3 is a diagram illustrating an example in which a presentation area of the temperature stimulus according to the first embodiment is changed.
Figure 3:
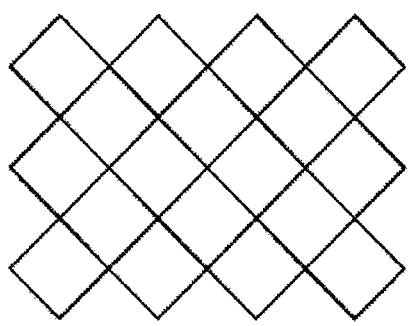

When the temperature stimulus is turned ON, the control unit 12 reduces a horizontal width of the mesh-shaped presentation unit 11, as illustrated in FIG. 3(a). Because this increases the number of heating wires per unit area (the density of the heating wires), the presentation area (=contact area) of the temperature stimulus increases and it is possible to give the temperature stimulus.

Step S2

When the temperature stimulus is turned OFF, the control unit 12 increases the horizontal width of the mesh-shaped presentation unit 11, as illustrated in FIG. 3(b). Because this decreases the number of heating wires per unit area (the density of the heating wires), the presentation area (=contact area) of the temperature stimulus decreases and it is possible not to give the temperature stimulus.

For a method of changing the shape of the presentation unit 11, a vertical width may be changed, in addition to the above-described horizontal width being changed, or both the horizontal width and the vertical width may be changed.

[2.3. Effects]

According to the first embodiment, the temperature stimulus presentation device 1 includes the presentation unit 11 that generates the heat at a predetermined temperature, and the control unit 12 that changes the area of the presentation unit 11 depending on whether or not the temperature stimulus is presented, thereby providing a technology capable of rapidly switching between ON and OFF of the temperature stimulus.

3. Second Embodiment

[3.1. Configuration of Temperature Stimulus Presentation Device]

Figure 4:
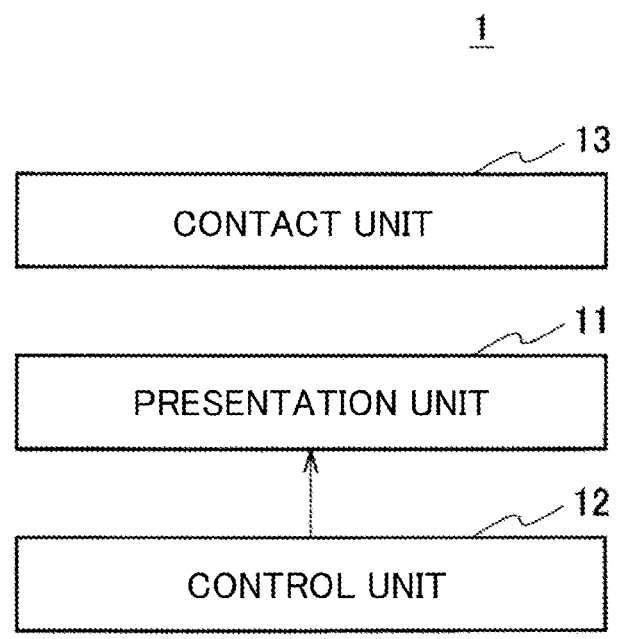
FIG. 4 is a diagram illustrating a configuration of a temperature stimulus presentation device according to a second embodiment.

FIG. 4 is a diagram illustrating a configuration of the temperature stimulus presentation device 1 according to a second embodiment. The temperature stimulus presentation device 1 includes a presentation unit 11, a control unit 12, and a contact unit 13.

The contact unit 13 is an exposed portion of the temperature stimulus presentation device 1 that the human body touches, and has a planar structure that comes into contact with the human body. The contact unit 13 is, for example, a thin metal plate.

The presentation unit 11 is disposed separately on the side of the contact unit 13 not in contact with the human body and has a structure and a function of generating heat at a predetermined temperature. The presentation unit 11 has a mesh structure in which heating wires are arranged in a mesh pattern, as in the first embodiment. The presentation unit 11 may be a thin metal plate. The presentation unit 11 is a separate body from the contact unit 13, and operates (including being driven) independently of the contact unit 13, and a distance, height, and position of the presentation unit 11 with respect to the contact unit 13 are controlled by using, for example, pins of a pin array.

The control unit 12 has a function and a mechanism for changing the distance, height, and position of the presentation unit 11 with respect to the contact unit 13 depending on whether or not the temperature stimulus is presented. For example, the control unit 12 causes the presentation unit 11 to come into contact with the contact unit 13 when presenting a temperature stimulus, and causes the presentation unit 11 not to come into contact with the contact unit 13 when not presenting the temperature stimulus. When presenting the temperature stimulus, the control unit 12 may control the presentation unit 11 to be positioned close to the contact unit 13 instead of causing the presentation unit 11 to come into direct contact with the contact unit 13.

The control unit 12 includes, for example, a computer installed in a housing of the temperature stimulus presentation device 1 and a control mechanism that mechanically controls the presentation unit 11. For example, when the computer receives a temperature stimulus ON instruction from the outside, the computer inputs a temperature stimulus ON command for giving a temperature stimulus to the control mechanism. The control mechanism moves the pins of the pin array to cause the presentation unit 11 to come into direct contact with or to be close to the contact unit 13 on the basis of the temperature stimulus ON command. On the other hand, when the computer receives a temperature stimulus OFF instruction from the outside, the computer inputs a temperature stimulus OFF command for not giving the temperature stimulus to the control mechanism. The control mechanism moves the pins of the pin array to separate the presentation unit 11 from the contact unit 13 on the basis of the temperature stimulus OFF command.

[3.2. Operation of Temperature Stimulus Presentation Device]

The temperature stimulus presentation device 1 switches between ON and OFF of the temperature stimulus presentation by causing the presentation unit 11 to come into and out of contact with the contact unit 13.

Step S1

Figure 5:
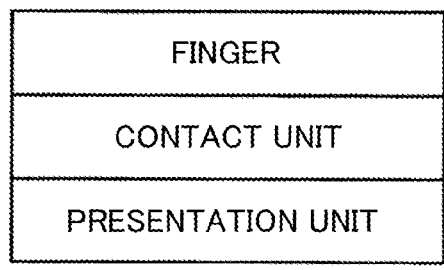
FIG. 5 is a diagram illustrating an example in which a presentation area of the temperature stimulus according to the second embodiment is changed.
Figure 5:
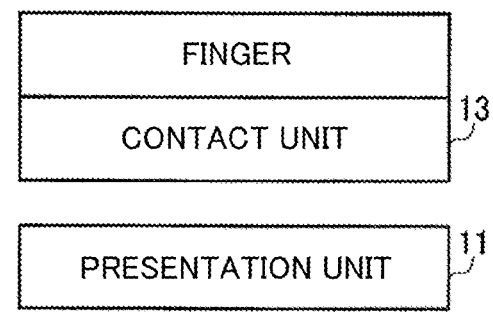

When the temperature stimulus is turned ON, the control unit 12 causes the presentation unit 11 to come into contact with the contact unit 13, as illustrated in FIG. 5(a). Accordingly, since the presentation unit 11 and the contact unit 13 are integrated, it is possible to give a temperature stimulus.

Step S2

When the temperature stimulus is turned OFF, the control unit 12 separates the presentation unit 11 from the contact unit 13, as illustrated in FIG. 5(b). That is, the control unit 12 sets a presentation area of the temperature stimulus to zero. Because this separates the presentation unit 11 from the contact unit 13, it is possible not to give the temperature stimulus.

[3.3. Application Example of Second Embodiment]

It is also possible to use a plurality of presentation units 11. When the temperature stimulus is turned ON, the control unit 12 causes a large number of presentation units 11 to come into contact with the contact unit 13, and when the temperature stimulus is turned OFF, the control unit 12 causes a small number of presentation units 11 to come into contact with the contact unit 13. This application example is a method of changing the presentation area (=contact area) of the temperature stimulus, and can be said to be an application example of the first embodiment. In this case, for the plurality of presentation units 11, the mesh-shaped presentation units 11 and the metal thin plate presentation unit 11 may both be presented.

[3.4. Effects]

According to the second embodiment, the temperature stimulus presentation device 1 includes the planar contact unit 13 that comes into contact with a human body, the presentation unit 11 disposed separately on the side of the contact unit 13 not in contact with the human body to generate heat at a predetermined temperature, and the control unit 12 that changes the distance of the presentation unit 11 with respect to the contact unit 13 depending on whether or not a temperature stimulus is presented. This makes it possible to provide a technology capable of rapidly switching between ON and OFF of temperature stimulus.

4. Application Example

The first embodiment and the second embodiment may be combined. When the temperature stimulus is turned ON, the control unit 12 decreases the horizontal width of the mesh-shaped presentation unit 11 to increase the number of heating wires per unit area (the density of the heating wires) and cause a large number of mesh-shaped presentation units 11 to come into contact with the contact unit 13. On the other hand, when the temperature stimulus is turned OFF, the control unit 12 increases the horizontal width of the mesh-shaped presentation unit 11 to decrease the number of heating wires per unit area (the density of the heating wires) and cause a small number of mesh-shaped presentation units 11 to come into contact with the contact unit 13.

5. Other

The present invention is not limited to the above embodiments and many modifications can be made within the scope of the gist thereof.

Figure 6:
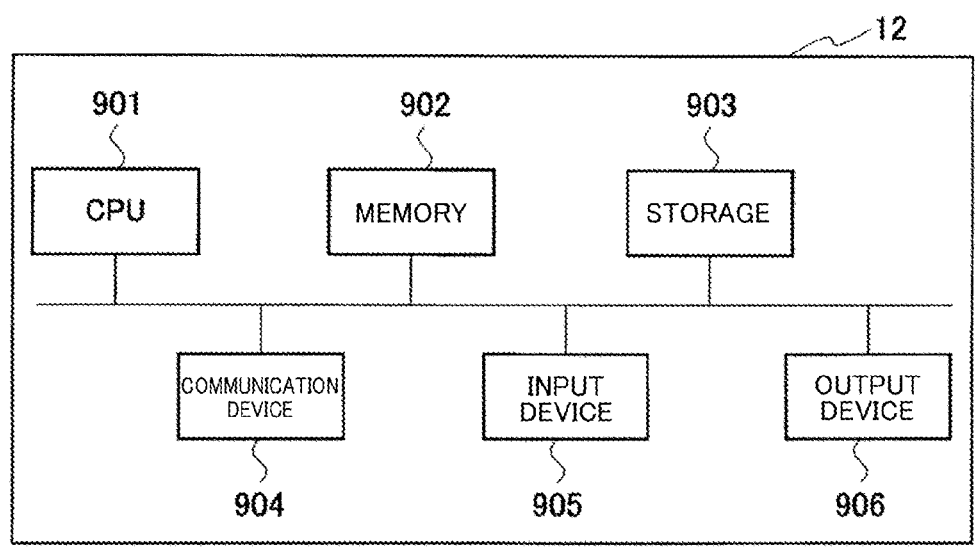
FIG. 6 is a diagram illustrating a hardware configuration of a control unit.

For the control unit 12 of the present embodiment described above, a general-purpose computer system including, for example, a central processing unit (CPU) 901, a memory 902, a storage 903 (a hard disk drive or a solid state drive), and a communication device 904, an input device 905, and an output device 906, as illustrated in FIG. 6, can be used. The memory 902 and the storage 903 are storage devices. In this computer system, each function of the control unit 12 is realized by the CPU 901 executing a predetermined program loaded on the memory 902.

The control unit 12 may be mounted in one computer or may be mounted in a plurality of computers. Further, the control unit 12 may be a virtual machine mounted in a computer. A program for the control unit 12 can be stored in a computer-readable recording medium such as an HDD, an SSD, a Universal Serial Bus (USB) memory, a compact disc (CD), or a digital versatile disc (DVD), or can be distributed via a network.

REFERENCE SIGNS LIST

1 Temperature stimulus presentation device
11 Presentation unit
12 Control unit
13 Contact unit
901 CPU
902 Memory
903 Storage
904 Communication device
905 Input device
906 Output device

The invention claimed is:

1. A temperature stimulus presentation device comprising:
a presentation unit, including one or more processors, configured to generate heat at a predetermined temperature; and
a control unit, including one or more processors, configured to change an area of the presentation unit depending on whether or not a temperature stimulus is presented.

2. A temperature stimulus presentation device comprising:
a planar contact unit, including one or more processors, configured to come into contact with a human body;
a presentation unit, including one or more processors, disposed separately on a side of the planar contact unit not in contact with the human body to generate heat at a predetermined temperature; and
a control unit, including one or more processors, configured to change a distance of the presentation unit with respect to the planar contact unit depending on whether or not a temperature stimulus is presented.

3. A temperature stimulus presentation method comprising:
generating, by a presentation unit, heat at a predetermined temperature; and
changing, by a control unit, an area of the presentation unit depending on whether or not a temperature stimulus is presented.

4. The temperature stimulus presentation method of claim 3 comprising:
changing, by the control unit, a distance of the presentation unit with respect to a planar contact unit depending on whether or not the temperature stimulus is presented, the planar contact unit coming into contact with a human body.

* * * * *